(12) United States Patent
Johnson et al.

(10) Patent No.: US 9,680,250 B2
(45) Date of Patent: Jun. 13, 2017

(54) METHOD AND LIGHT ENCLOSURE WITH JACK THROUGH LENS

(71) Applicant: Construction Innovations, Inc., Pine City, MN (US)

(72) Inventors: Todd R. Johnson, Wyoming, MN (US); Glen J. Harmon, Pine City, MN (US)

(73) Assignee: Construction Innovations, Inc., Pine City, MN (US)

( * ) Notice: Subject to any disclaimer, the term of this patent is extended or adjusted under 35 U.S.C. 154(b) by 532 days.

(21) Appl. No.: 14/326,437

(22) Filed: Jul. 8, 2014

(65) Prior Publication Data
US 2016/0010825 A1    Jan. 14, 2016

(51) Int. Cl.
*B60Q 1/00* (2006.01)
*H01R 13/52* (2006.01)
*F21S 8/10* (2006.01)
*H01R 43/00* (2006.01)

(52) U.S. Cl.
CPC ........ *H01R 13/5202* (2013.01); *B60Q 1/0017* (2013.01); *F21S 48/211* (2013.01); *F21S 48/22* (2013.01); *H01R 43/005* (2013.01)

(58) Field of Classification Search
CPC ... B60D 1/60; B60D 1/62; B60D 1/64; B60Q 1/305
USPC ................................................. 362/459–549
See application file for complete search history.

(56) References Cited

U.S. PATENT DOCUMENTS

| | | | |
|---|---|---|---|
| 3,046,388 A | | 7/1962 | Shinn |
| 3,344,265 A | * | 9/1967 | Dillabough, Jr. .... B60Q 1/2615 362/548 |
| 3,457,396 A | * | 7/1969 | Mrsny ..................... B60Q 3/06 362/20 |
| 3,612,852 A | | 10/1971 | Bogossian |
| 4,771,369 A | | 9/1988 | Hymer |
| 5,335,155 A | * | 8/1994 | Hanson ................. F21S 48/211 362/267 |
| 7,695,041 B2 | | 4/2010 | Reed et al. |
| 2005/0105296 A1 | * | 5/2005 | French ..................... B60D 1/60 362/485 |

* cited by examiner

*Primary Examiner* — William Carter
(74) *Attorney, Agent, or Firm* — Charles A. Lemaire; Jonathan M. Rixen; Lemaire Patent Law Firm, P.L.L.C.

(57) ABSTRACT

Method and apparatus for supplying external power through a sealed light enclosure that includes a lens portion and a back portion, a first electrical connector mounted through the back portion; a light source inside the enclosure connected to the first electrical connector such that when electrical power is applied to the first electrical connector, the light source illuminates. A second electrical connector has a connection interface exposed on the outer face of the lens portion, wherein the second connector is electrically connected to the first electrical connector, optionally through a series-connected fuse. The second connector is mounted on the back portion and sealed to the lens portion. Some embodiments include a rubber plug that can be plugged into the second connector to keep moisture out, wherein the plug includes an indicator light for indicating whether power is available through the second connector (i.e., that the fuse is not blown).

21 Claims, 7 Drawing Sheets

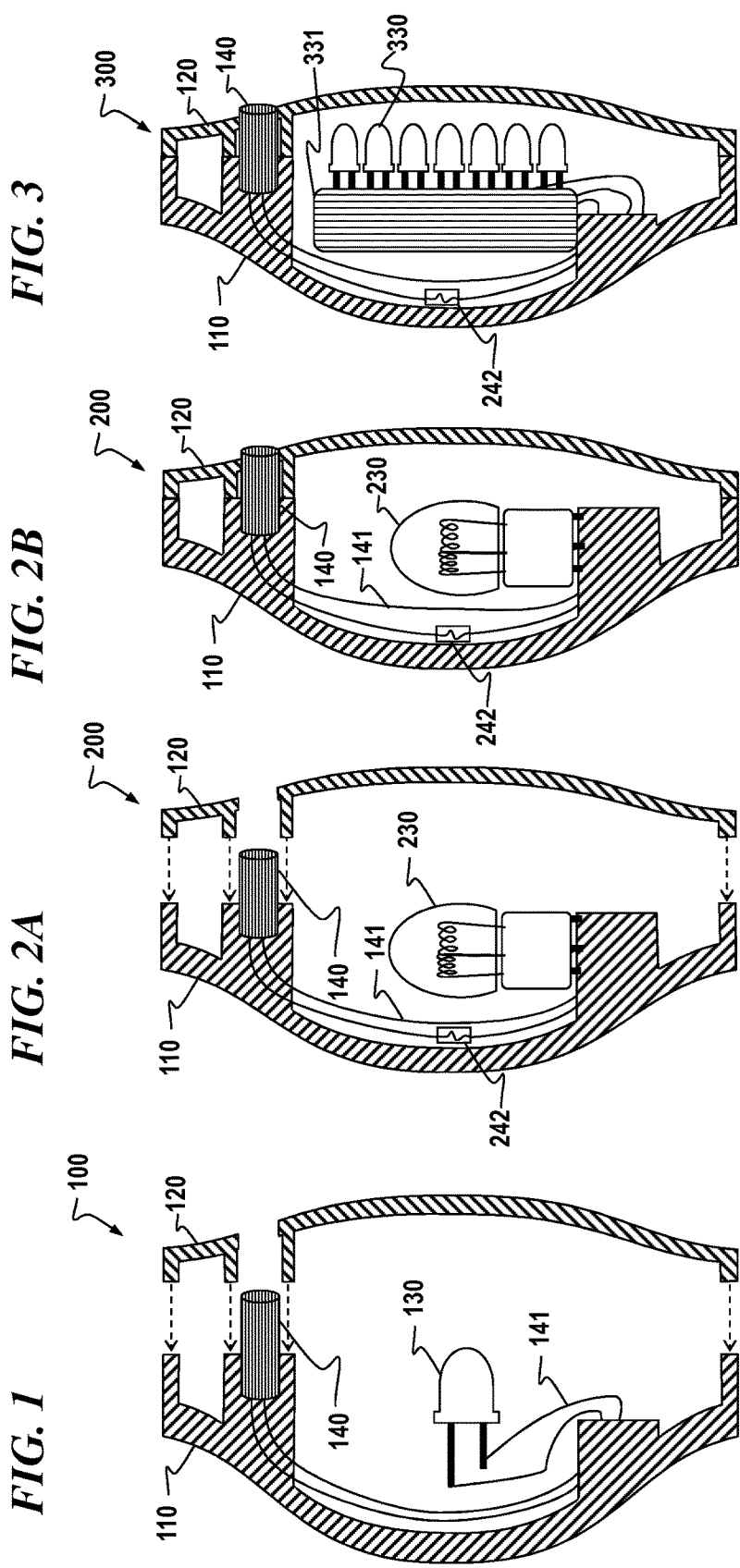

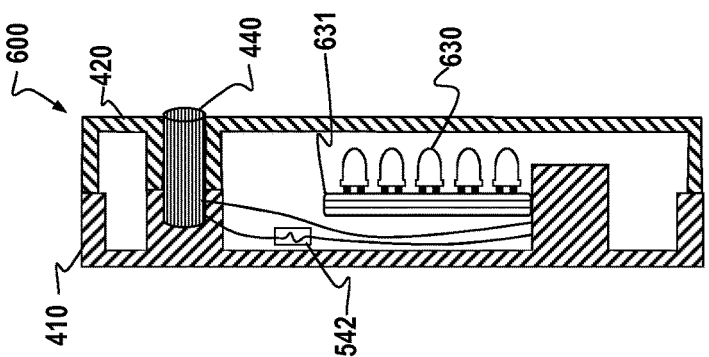
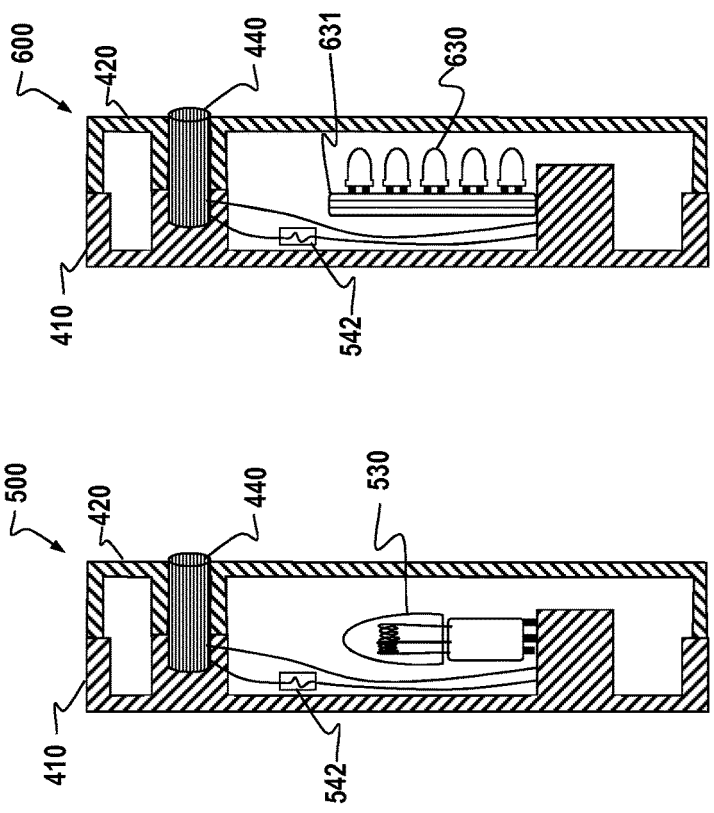
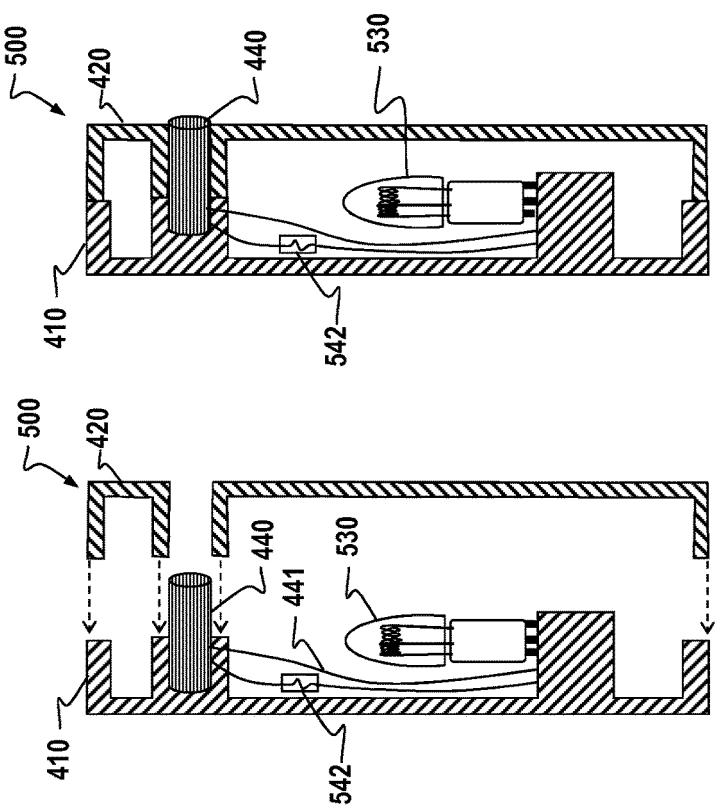
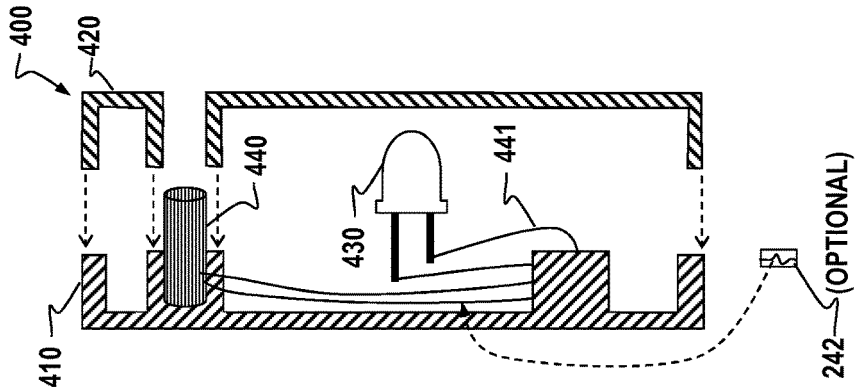

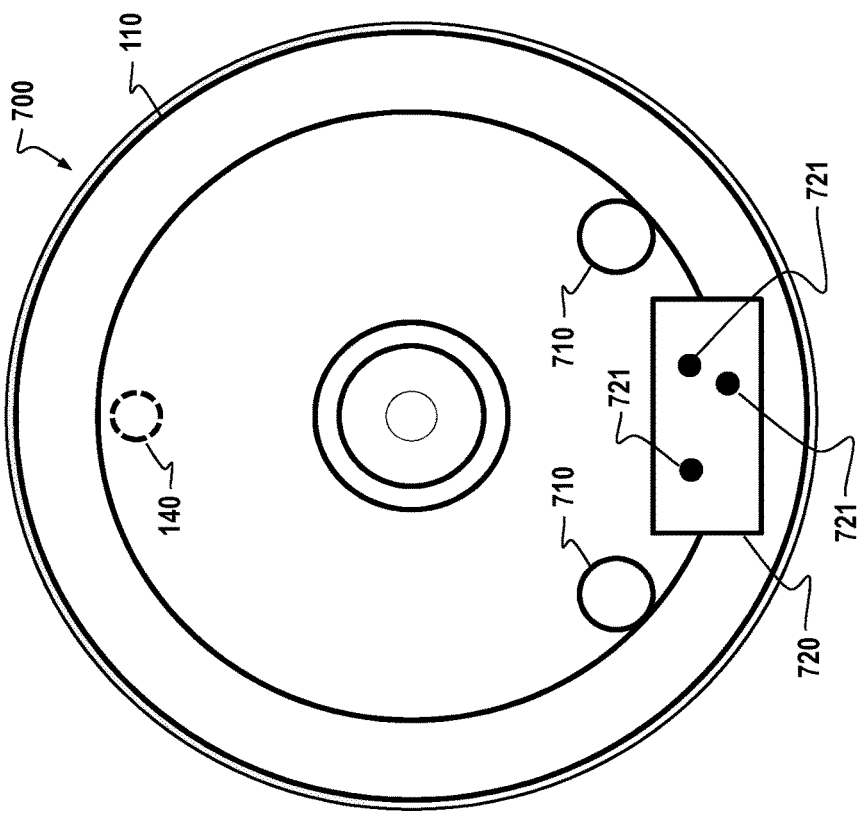
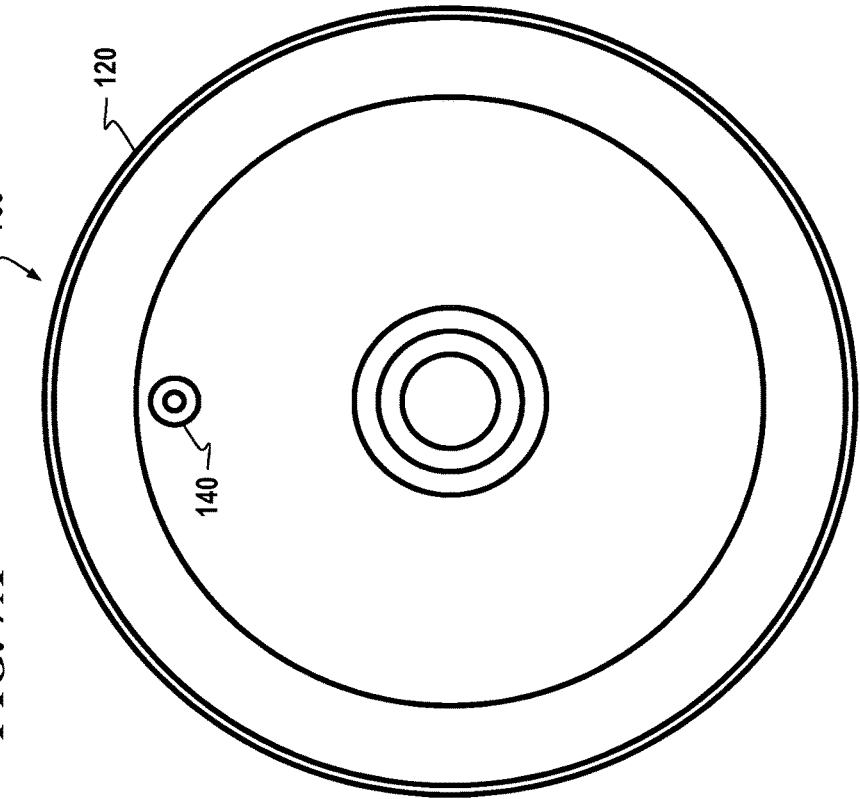

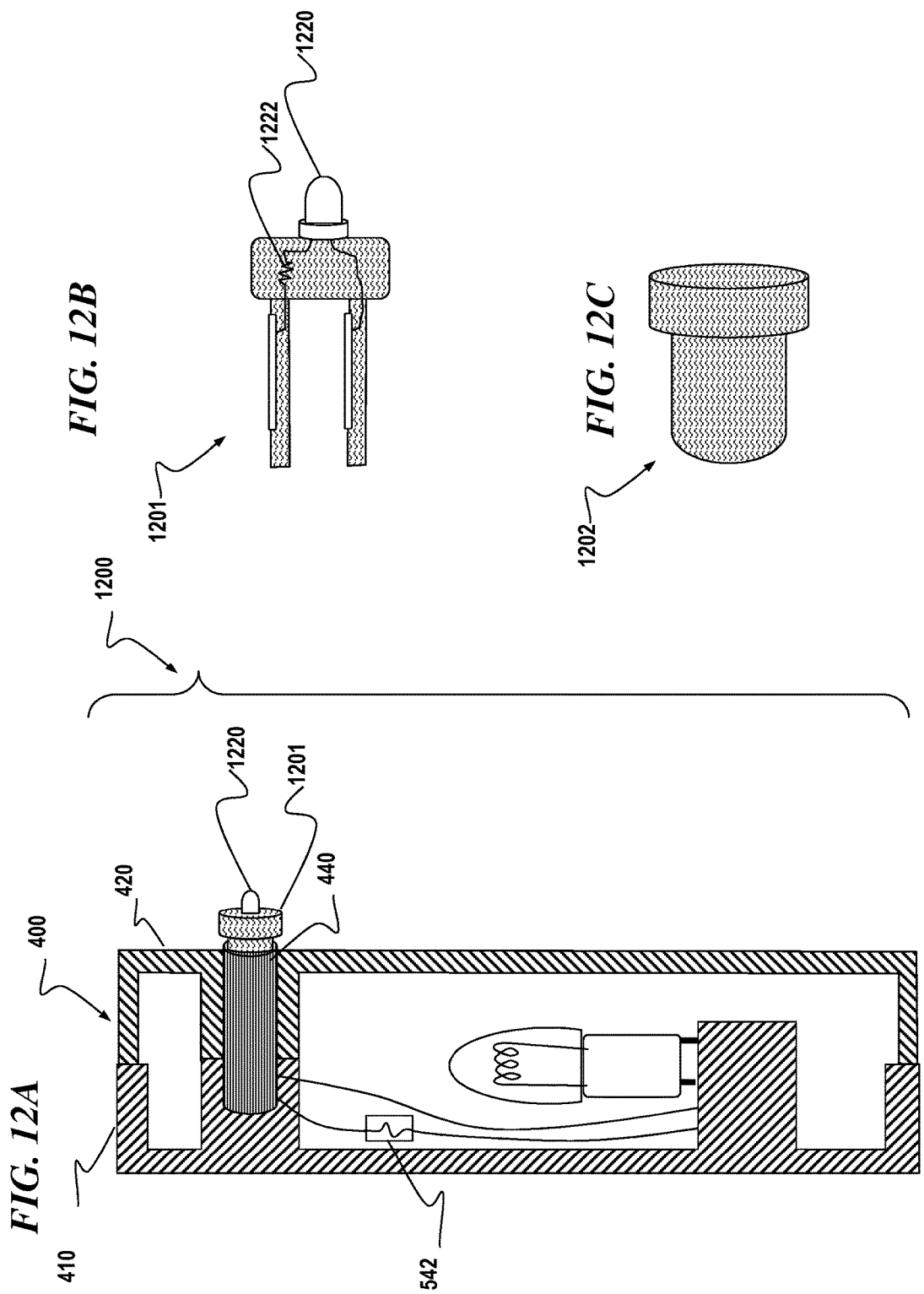

METHOD AND LIGHT ENCLOSURE WITH JACK THROUGH LENS

FIELD OF THE INVENTION

The invention relates generally to automotive accessories and more particularly to methods and apparatus for a sealed replaceable light assembly that includes an electrical power jack that extends through the outside transparent lamp portion of the light assembly, wherein the light assembly optionally includes a conductor that includes a fuse to protect against shorts and overload conditions, and wherein the apparatus optionally includes a sealing plug that includes an LED test circuit to indicate that power is available through the jack (i.e., that tests whether the fuse has blown).

BACKGROUND OF THE INVENTION

The invention relates generally to automotive accessories. Over-the-road trailers often include replaceable sealed plastic taillights that pop into a rubber gasket on a round hole in the trailer frame. An internal electrical cable has a plug that is connected to the back/inside of the sealed taillight. In some embodiments, the electrical cable plug includes three wires: ground, running-light power, and brake-light power. The outer lens face (usually transparent red plastic having an inside face with an array of corner reflectors) is typically sealed to the inside/back portion.

Truckers are often faced with the need for 12-volt power at the back of the trailer, but no power jacks are available on most trailers. Some folks splice wires to the internal electrical cable and try to run the spliced wired through or around the rubber gasket that holds the taillight to the trailer. This runs the risk of shorting the wires to the sheet-metal frame surrounding the rubber gasket. In addition, the splices tend to corrode and do not provide reliable long-term electrical connectivity.

Accordingly, there is a need in the art for improved methods and devices for supplying power to an external electrical connection on a vehicle.

SUMMARY OF THE INVENTION

In some embodiments, the present invention provides a method and apparatus for supplying external power through a sealed light enclosure (e.g., a replaceable taillight or running light for a truck trailer). The enclosure includes a lens portion and a back portion, a first electrical connector mounted through the back portion; a primary light source inside the enclosure connected to the first electrical connector, and a second electrical connector has a connection interface exposed on the outer face of the lens portion. The second connector is electrically connected to the first electrical connector, optionally through a series-connected fuse. In some embodiments, the second connector is mounted on the back portion and sealed to the lens portion. Some embodiments include a plug that can be plugged into the second connector to keep moisture out, wherein the plug includes an indicator light (e.g., in some embodiments, the indicator light includes an LED and a current-limiting resistor) for indicating whether power is available through the second connector (i.e., that the fuse is not blown). This plug is useful since the primary light source is connected to the first electrical connector directly, and thus the primary light source illuminates whenever electrical power is applied to the first electrical connector that is inside the vehicle when the replaceable taillight or running light is mounted to the rubber gasket on the vehicle (e.g., in some embodiments, an over-the-road trailer). This primary light being illuminated, by itself, does not provide any indication as to whether the fuse is intact and supplying power to the second electrical connector on the outside face of the taillight of the present invention—it only indicates that power is being supplied to the first electrical connector. The LED plug thus provides a direct indication that the fuse is intact and the circuit is supplying power to the second electrical connector on the outside face of the taillight.

BRIEF DESCRIPTION OF THE FIGURES

Each of the items shown in the following brief description of the drawings represents some embodiments of the present invention.

FIG. 1 is a cross-section view of an electrical-light enclosure 100 that provides an external electrical jack through the lens portion of the enclosure, according to some embodiments of the present invention, wherein the electrical-light enclosure uses a single light emitting diode as the primary light source.

FIG. 2A is a cross-section view of an electrical-light enclosure 200 that provides an external electrical jack through the lens portion of the enclosure, before assembly, according to some embodiments of the present invention, with an electric lamp 230 and a fuse 242.

FIG. 2B is a cross-section view of electrical-light enclosure 200 that provides an external electrical jack through the lens portion of the enclosure, after assembly, according to some embodiments of the present invention, with an electric lamp and a fuse, wherein the lens portion is now attached to the back portion.

FIG. 3 is a cross-section view of an electrical-light enclosure 300 that provides an external electrical jack through the lens portion of the enclosure according to some embodiments of the present invention, with a plurality of light emitting diodes and a fuse.

FIG. 4 is a cross-section view of an electrical-light enclosure 400 that provides an external electrical jack through the lens portion of the enclosure according to other embodiments of the present invention, with a single light emitting diode.

FIG. 5A is a cross-section view of an electrical-light enclosure 500 that provides an external electrical jack through the lens portion of the enclosure 500, before assembly, according to other embodiments of the present invention, with an electric lamp and a fuse.

FIG. 5B is a cross-section view of electrical-light enclosure 500 that provides an external electrical jack through the lens portion of the enclosure 500, after assembly, according to other embodiments of the present invention, with an electric lamp and a fuse, and the lens portion attached to the back portion.

FIG. 6 is a cross-section view of an electrical-light enclosure 400 that provides an external electrical jack through the lens portion of the enclosure 600 according to other embodiments of the present invention, with a plurality of light emitting diodes and a fuse.

FIG. 7A is a front view of an assembly 700 (which represents the lens portion of electrical-light enclosures 100, 200 or 300), according to some embodiments of the present invention.

FIG. 7B is a back view of an assembly 700 (which represents the back portion of electrical-light enclosures 100, 200 or 300), according to some embodiments of the present invention.

FIG. 12A is a cross-section view of an enclosure 400 according to some embodiments of the present invention which includes a sealing cover 1201 with an indicator light 1220 for the connector on the lens side.

FIG. 12B is a cross-section view of a sealing plug 1201 that includes an LED circuit (resistor 1222 and LED 1220) for indicating whether the jack has power, according to some embodiments of the present invention.

FIG. 12C is a cross-section view of a rubber sealing plug 1202 without an LED circuit, according to some embodiments of the present invention.

DETAILED DESCRIPTION OF THE INVENTION

Figure 8B:
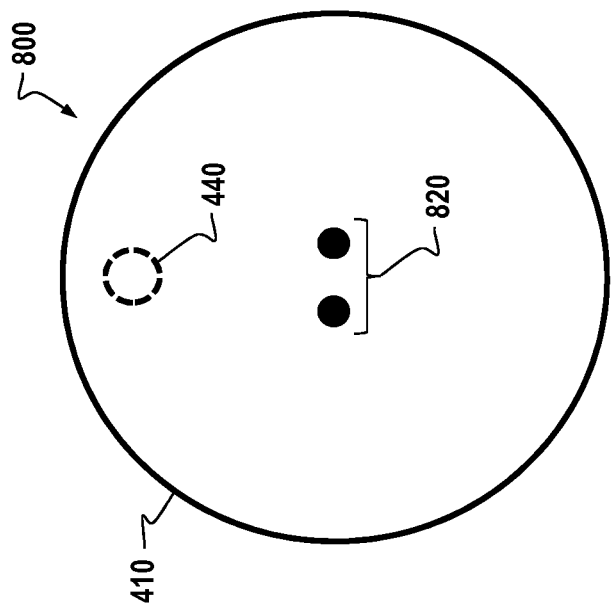
FIG. 8B is a back view of an assembly 800 (which represents the back portion of electrical-light enclosures 400, 500 or 600), according to other embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

FIG. 1 is a cross-section view of an enclosure 100 according to some embodiments of the present invention. The enclosure includes a back portion 110 and a lens portion 120. In some embodiments, the light enclosure is used as a taillight on a vehicle. In such cases, the lens portion 120 is made of a transparent red material, such as plastic or glass. The enclosure includes a light source, which, in some embodiments, is a single light emitting diode (LED) 130. The enclosure further includes a first electrical connector on the back portion which is not visible in FIG. 1. (See 720 in FIG. 7B.) The first connector attaches to an external cable which provides power to the light source in the enclosure. In some embodiments, the enclosure is mounted in the body of a vehicle, and the power for the light source is supplied by the vehicle. The enclosure also includes a second electrical connector 140, affixed to the back portion of the enclosure, such that when the lens portion of the enclosure is attached to the back portion of the enclosure, the second connector 140 is accessible from the lens side of the enclosure. Electrical power from first (back) connector 720 is supplied to the light source 130 and the second (front) connector 140 through internal wiring 141. The second connector provides electrical power to external devices, such as work lights, which are plugged into the connector 140. In some embodiments, the second connector is a jack configured to receive an electrical plug from a wire or cable that is connected to such an external device.

FIG. 2A is a cross-section view of an enclosure 200, before assembly, according to other embodiments of the present invention. This embodiment is similar to that shown in FIG. 1, but the light source is an electric lamp 230. This embodiment also includes a fuse 242. The fuse provides electrical protection, limiting the electrical power that is provided to any external device connected via the front connector 140.

FIG. 2B is a cross-section view of electrical-light enclosure 200, after assembly, according to some embodiments of the present invention and shows the same embodiment as that shown in FIG. 2A. In FIG. 2B, the lens portion is shown attached to the back portion of the enclosure. In some embodiments, a seal is provided between the lens portion 120 and the back portion 110, which, in some embodiments, is waterproof. In some embodiments, a seal is provided between the lens portion 120 and the support for second connector 140, which, in some embodiments, is a waterproof seal. In some embodiments, the lens portion 120 is sealed to back portion 110 using an adhesive, solvent, or ultrasonic welding FIG. 3 is a cross-section view of an electrical-light enclosure 300 that provides an external electrical jack through the lens portion of the enclosure according to some embodiments of the present invention. This embodiment is similar to those shown in FIG. 1 and FIG. 2, but the light source is a plurality of light emitting diodes 330, attached to a carrier 331.

FIG. 4 is a cross-section view of an electrical-light enclosure 400 according to other embodiments of the present invention. The enclosure 400 includes a back portion 410 and a lens portion 420. In some embodiments, the light enclosure 400 is used as a running light on a vehicle. In such cases, the lens portion 420 is made of a transparent yellow, amber or clear material, such as a polymer or glass. The enclosure 400 includes a light source, which, in some embodiments, is a single light emitting diode (LED) 430. The enclosure further includes a first electrical connector on the back portion which is not visible in FIG. 4. (See 820 in FIG. 8B.) The first connector attaches to an external cable which provides power to the light source in the enclosure. In some embodiments, the enclosure is mounted in the body of a vehicle, and the power for the light source is supplied by the vehicle. The enclosure also includes a second electrical connector 440, affixed to the back portion of the enclosure, such that when the lens portion of the enclosure is attached to the back portion of the enclosure, the second connector 440 is accessible from the lens side of the enclosure. Electrical power from first (back) connector 820 is supplied to the light source 430 and the second (front) connector 440 through internal wiring 441. The second connector provides electrical power to external devices, such as work lights, which are plugged into the connector 440. In some embodiments, the second connector is a jack configured to receive an electrical plug from a wire or cable that is connected to such an external device.

FIG. 5A is a cross-section view of an electrical-light enclosure 500 that provides an external electrical jack through the lens portion of the enclosure 500, before assembly, according to other embodiments of the present invention. This embodiment is similar to that shown in FIG. 4, but the light source is an electric lamp 530. This embodiment also includes a fuse 542. The fuse provides electrical protection, limiting the electrical power that is provided to any external device connected via the front connector 440.

FIG. 5B is a cross-section view of an electrical-light enclosure 500 that provides an external electrical jack through the lens portion of the enclosure 500, after assembly, according to some embodiments of the present invention and shows the assembled version of the same embodiment as that shown in FIG. 5A. In FIG. 5B, the lens portion is shown attached to the back portion of the enclosure. In some embodiments, a seal is provided between the lens portion 420 and the back portion 410, which, in some embodiments, is waterproof. In some embodiments, a seal is provided between the lens portion 420 and the support for the second connector 440, which, in some embodiments, is waterproof.

FIG. 6 is a cross-section view of an enclosure according to some embodiments of the present invention. This embodiment is similar to those shown in FIG. 4 and FIG. 5, but the light source is a plurality of light emitting diodes 630, attached to a carrier 631.

FIG. 7A is a front view of an enclosure 100 according to some embodiments of the present invention. The second (front) connector 140 is readily accessible on the front (lens) side 120 of the enclosure. When the enclosure is mounted in the body of a vehicle, the connector 140 is used to supply electrical power to devices outside of the vehicle FIG. 7B is a back view of an enclosure 100 according to some embodiments of the present invention. In some embodiments, the back portion 110 the enclosure is secured to a vehicle with fasteners that attach to the receivers 710. The back portion also includes an electrical connector 720 with contacts 721. In some embodiments, the electrical connector 720 is a jack configured to receive an electrical plug connected to a wire/cable inside a vehicle.

Figure 8A:
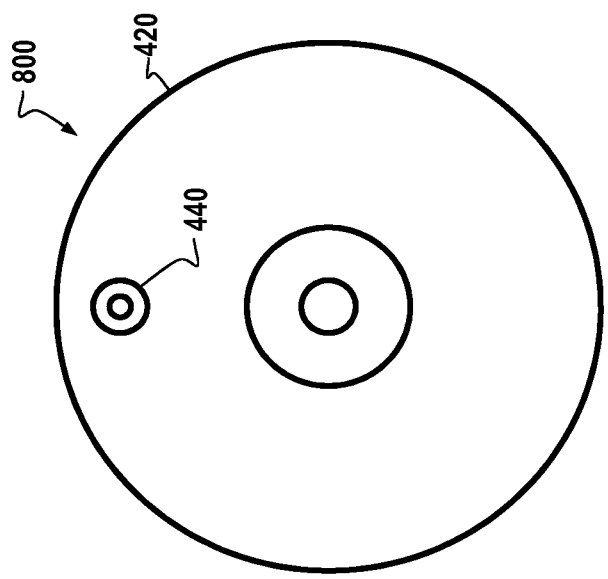
FIG. 8A is a front view of an assembly 800 (which represents the lens portion of electrical-light enclosures 400, 500 or 600), according to other embodiments of the present invention.

FIG. 8A is a front view of an enclosure 400 according to other embodiments of the present invention. The second (front) connector 440 is readily accessible on the front (lens) side 420 of the enclosure. When the enclosure is mounted in the body of a vehicle, the connector 440 is used to supply electrical power to devices outside of the vehicle FIG. 8B is a back view of an enclosure 400 according to other embodiments of the present invention. The back portion includes an electrical connector 820. In some embodiments, the electrical connector 820 is a jack configured to receive an electrical plug connected to a wire/cable inside a vehicle.

Figure 9:
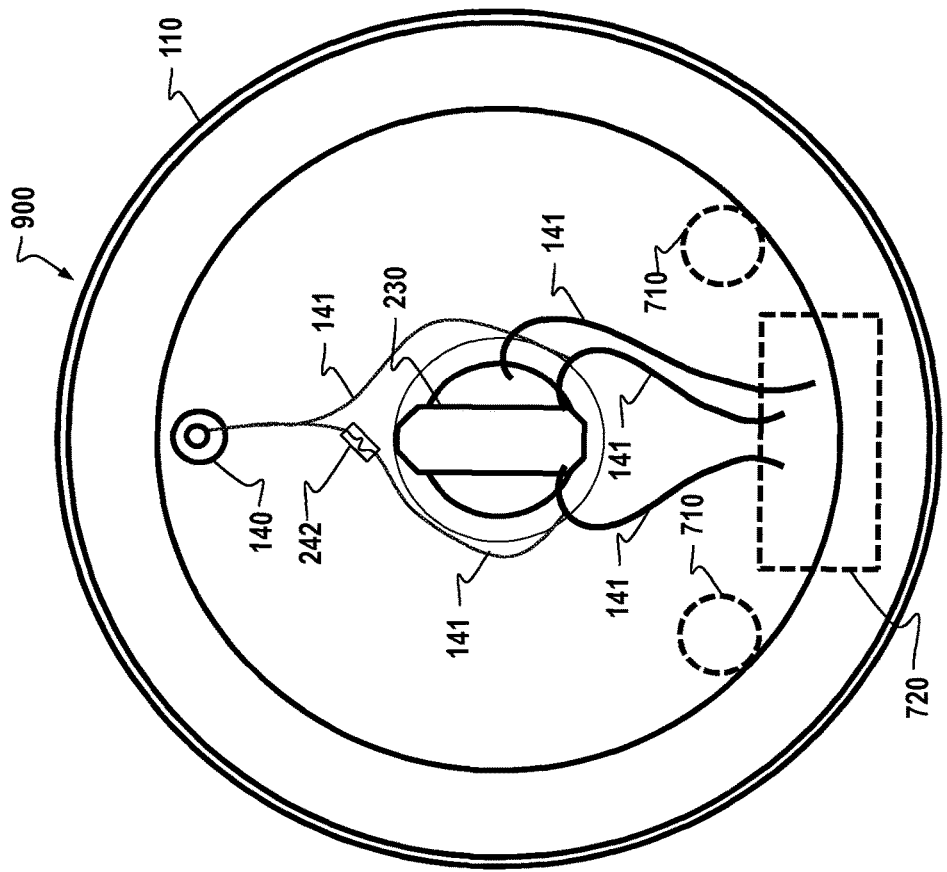
FIG. 9 is a front view of the inside of the back portion of an assembly 900 (which represents the back portion of electrical-light enclosures 100, 200 or 300), according to some embodiments of the present invention.

FIG. 9 is a view of the inside of the back portion 110 of an enclosure 100 according to some embodiments of the present invention. In this figure, the wiring 141 can be seen, connecting the first (back) connector 720, with the electric lamp 230 and the second (front) connector 140.

Figure 10:
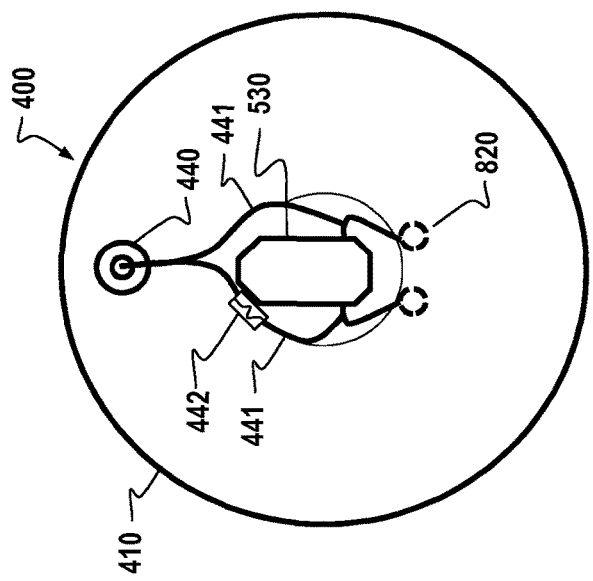
FIG. 10 is a view of the inside of the back portion of an assembly 900 (which represents the back portion of electrical-light enclosures 400, 500 or 600), according to other embodiments of the present invention.

FIG. 10 is a view of the inside of the back portion 410 of an enclosure 400 according to other embodiments of the present invention. In this figure, the wiring 441 can be seen, connecting the first (back) connector 820, with the electric lamp 530 and the second (front) connector 440.

Figure 11:
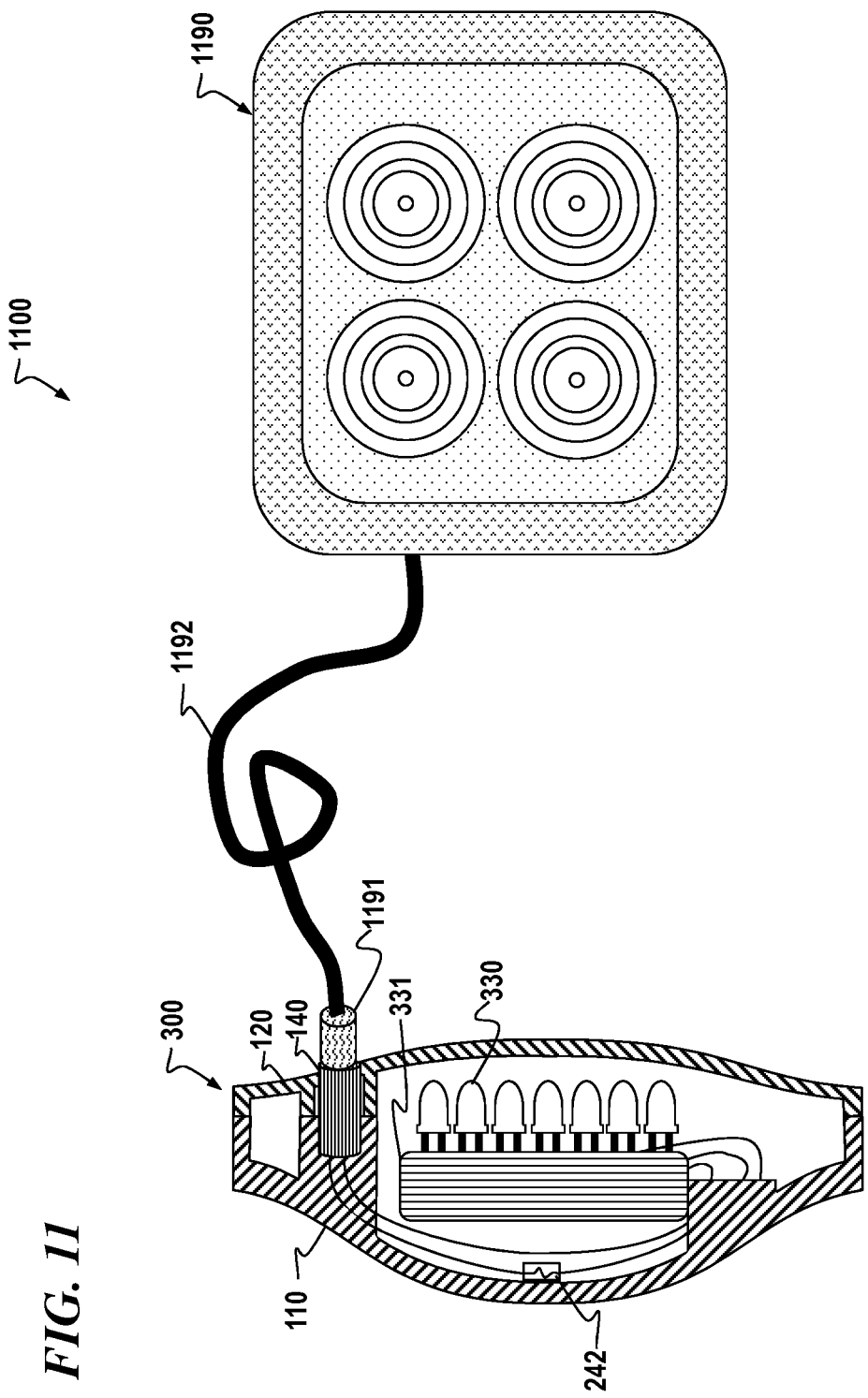
FIG. 11 is a cross-section view of an enclosure system 1100, including electrical-light enclosure 400 attached to an external work light 1190, according to some embodiments of the present invention.

FIG. 11 is a cross-section view of an enclosure 100, attached to an external work light 90, according to some embodiments of the present invention. In this example, electrical power to the work light 1190 is supplied through a cable 1192. At the end of the cable is a plug 91 which plugs into the front connector 140 of the enclosure. The present invent provides a convenient way to power external devices from a vehicles power supply.

FIG. 12A is a cross-section view of an enclosure 400 according to some embodiments of the present invention. Included in this embodiment is a cover 1201 for the front connector 440. The cover 1201 provides a waterproof or water-resistant seal over the connector.

FIG. 12B is a cross-section view of a sealing plug 1201 that includes an LED circuit (resistor 1222 and LED 1220) for indicating whether the jack has power, according to some embodiments of the present invention.

FIG. 12C is a cross-section view of a rubber sealing plug 1202 without an LED circuit, according to some embodiments of the present invention.

In some embodiments, the present invention includes a sealed light enclosure which includes: a sealed enclosure having a lens side and a back side such that the back side of the enclosure includes a first electrical connector; one or more light sources inside the sealed enclosure connected to the first electrical connector such that when electrical power is applied to the first electrical connector, the one or more light sources illuminate; a second electrical connector on the lens side of the light enclosure, with the second electrical connector connected to the first electrical connector, and a fuse in the connection between the first electrical connector and the second electrical connector. When electrical power is applied to the first electrical connector, electrical power is supplied to the second electrical connector. In some embodiments, the present invention includes a seal between the second electrical connector and the lens side of the light enclosure.

In some embodiments, the sealed enclosure is waterproof. In some embodiments, the seal between the second electrical connector and the lens side is waterproof.

In some embodiments of the present invention, the light enclosure is mounted in a body of a vehicle. In some embodiments, the present invention further includes a grommet is used to mount the light enclosure in a body of a vehicle. The grommet provides a waterproof seal between the light enclosure and the body of the vehicle.

In some embodiments, the light enclosure further includes a cover for the second electrical connector on the lens of light enclosure. The cover provides a waterproof seal for the second electrical connector. In other embodiments, the cover further includes a light emitting diode that connects to the second electrical connector when the cover is installed and illuminates when electrical power is applied to the first electrical connector.

In some embodiments, the light source in the light enclosure is at least one electric lamp. In other embodiments, the light source in the light enclosure is at least one light emitting diode.

In some embodiments, the light enclosure functions as a tail light for a vehicle. In other embodiments, the light enclosure functions as a running light for a vehicle.

In some embodiments, the present invention includes an apparatus that includes an enclosure for a light, the enclosure includes: a lens portion and a back portion, where the lens portion has an inner face and an outer face; a first electrical connector mounted to the back portion; at least one light source inside the enclosure connected to the first electrical connector such that when electrical power is applied to the first electrical connector, the one or more light sources illuminate; and a second electrical connector having a connection interface exposed on the outer face of the lens portion of the light enclosure. The second electrical connector is electrically connected to the first electrical connector, and the second electrical connector is sealed to the lens portion of the light enclosure.

In some embodiments, the first electrical connector is a jack configured to receive an electrical plug connected to a wire/cable inside a vehicle, and the second electrical connector is a jack configured to receive a second electrical plug connected to a wire/cable outside a vehicle. In some embodiments, the second electrical plug has a female connection within a male connection.

In some embodiments, the present invention includes a fuse in the connection between the first electrical connector and the second electrical connector. When electrical power is applied to the first electrical connector, electrical power is supplied to the second electrical connector. In some embodiments, the enclosure is sealed between the second electrical connector and the lens portion and is waterproof.

In some embodiments, the present invention further includes a vehicle, and the light enclosure is mounted in a body of the vehicle. In some embodiments, a grommet is used to mount the light enclosure in a body of a vehicle, such that the grommet provides a waterproof seal between the light enclosure and the body of the vehicle.

In some embodiments, the light enclosure further includes a cover for the second electrical connector on the lens portion of the enclosure, and the cover provides a waterproof seal over the second electrical connector. In other embodiments, the cover includes a light emitting diode that connects to the second electrical connector when the cover is installed and illuminates when electrical power is applied to the first electrical connector.

In some embodiments, the light source is an electric lamp. In other embodiments, the light source is a light emitting diode.

In some embodiments, the enclosure is a tail light for a vehicle. In other embodiments, the enclosure is a running light for a vehicle.

In some embodiments, the present invention includes a method for making an enclosure having a light, the method includes: providing a lens portion having an opening therethrough, and the lens portion has an inner face and an outer face; providing a back portion; mounting a first electrical connector to the back portion; mounting at least one light source on an inner face of the back portion; electrically connecting the first electrical connector to the at least one light source; mounting a second electrical connector to the back portion; electrically connecting the first electrical connector to the second electrical connector; exposing a connection interface of the second electrical connector on the outer face of the lens portion of the light enclosure; sealing the second electrical connector to the lens portion of the light enclosure; and sealing a perimeter of the lens portion to a perimeter of the back portion.

In some embodiments, the first electrical connector is a jack configured to receive an electrical plug connected to a wire/cable inside a vehicle, and the second electrical connector is a jack configured to receive a second electrical plug connected to a wire/cable outside a vehicle. In some embodiments, the second electrical plug has a female connection within a male connection. In some embodiments, the method further includes providing a fuse in the connection between the first electrical connector and the second electrical connector. When electrical power is applied to the first electrical connector, electrical power is supplied to the second electrical connector.

In some embodiments, the seal between the second electrical connector and the lens portion is waterproof.

In some embodiments of the present invention, the method of claim 8, further includes providing a vehicle, and mounting the enclosure in a body of the vehicle. In some embodiments, the method includes providing a grommet and mounting the enclosure in a body of a vehicle, such that the grommet provides a waterproof seal between the enclosure and the body of the vehicle.

In some embodiments, the method of the present invention further includes providing a cover for the second electrical connector on the lens portion of the enclosure, and the cover provides a waterproof seal over the second electrical connector. In other embodiments, the method further includes providing a light emitting diode, mounting the light emitting diode in the cover for the second electrical connector, and, when the cover is installed on the second electrical connector, connecting the light emitting diode to the second electrical connector. The light emitting diode illuminates when electrical power is applied to the first electrical connector.

In some embodiments, the light source is an electric lamp. In other embodiments, the light source is a light emitting diode.

In some embodiments, the enclosure functions as a tail light (in some such embodiments, a running light combined with a brake light, with a red transparent lens) for a vehicle. In other embodiments, the enclosure is a running light (in some such embodiments, a running light with an amber transparent lens) for a vehicle.

In some embodiments, the present invention includes an apparatus including: a lens portion having an opening therethrough, where the lens portion has an inner face and an outer face; a back portion; a means for mounting a first electrical connector to the back portion; a means for mounting at least one light source on an inner face of the back portion; a means for electrically connecting the first electrical connector to the at least one light source; a means for mounting a second electrical connector to the back portion; a means for electrically connecting the first electrical connector to the second electrical connector; a means for exposing a connection interface of the second electrical connector on the outer face of the lens portion of the light enclosure; a means for sealing the second electrical connector to the lens portion of the light enclosure; and a means for sealing a perimeter of the lens portion to a perimeter of the back portion.

In some embodiments, the first electrical connector is a jack configured to receive an electrical plug connected to a wire/cable inside a vehicle, and the second electrical connector is a jack configured to receive a second electrical plug connected to a wire/cable outside a vehicle. In some embodiments, the second electrical plug has a female connection within a male connection.

In some embodiments, the present invention further includes a means for electrically connecting a fuse in the connection between the first electrical connector and the second electrical connector, such that when electrical power is applied to the first electrical connector, electrical power is supplied to the second electrical connector.

In some embodiments, the means for sealing the second electrical connector and the lens portion is waterproof.

In some embodiments, the present invention further includes a means for mounting the enclosure in a body of a vehicle. In some embodiments, the apparatus further includes a means for mounting the enclosure in the body of the vehicle with a grommet, where the grommet provides a waterproof seal between the enclosure and the body of the vehicle.

In some embodiments, the present invention further includes a means for covering the second electrical connector on the lens portion of the enclosure, and the cover provides a waterproof seal over the second electrical connector. In other embodiments, the present invention further includes a means for mounting a light emitting diode in the cover for the second electrical connector, and a means for connecting the light emitting diode to the second electrical connector when the cover is installed on the second electrical connector, such that the light emitting diode illuminates when electrical power is applied to the first electrical connector.

In some embodiments, the light source is an electric lamp. In other embodiments, the light source is a light emitting diode.

In some embodiments, the enclosure functions as a tail light for a vehicle. In other embodiments, the enclosure functions as a running light for a vehicle.

In some embodiments, the present invention is an apparatus including an enclosure for a light, the enclosure including: a lens portion and a back portion, where the lens portion has an inner face and an outer face; a first electrical connector mounted to the back portion; at least one light source inside the enclosure connected to the first electrical connector such that when electrical power is applied to the first electrical connector, the one or more light sources illuminate; and a second electrical connector having a connection interface exposed on the outer face of the lens portion of the light enclosure, with the second electrical connector electrically connected to the first electrical connector. The second electrical connector is sealed to the lens portion of the light enclosure and the seal is waterproof.

Some embodiments further include a fuse in the connection between the first electrical connector and the second electrical connector, and when electrical power is applied to the first electrical connector, electrical power is supplied to the second electrical connector.

Some embodiments further include a cover for the second electrical connector on the lens portion of the enclosure, and the cover provides a waterproof seal over the second electrical connector. The cover includes a light emitting diode that connects to the second electrical connector when the cover is installed and illuminates when electrical power is applied to the first electrical connector.

Some embodiments further include a vehicle, where the light enclosure is mounted in a body of the vehicle. The first electrical connector is a jack configured to receive an electrical plug connected to a wire/cable inside the vehicle, and the second electrical connector is a jack configured to receive a second electrical plug connected to a wire/cable outside the vehicle. In some embodiments, the second electrical plug has a female connection within a male connection. In some embodiments, a grommet is used to mount the light enclosure in a body of the vehicle, wherein the grommet provides a waterproof seal between the light enclosure and the body of the vehicle.

In some embodiments, the enclosure is a taillight for the vehicle.

In some embodiments, the present invention includes a method for making an enclosure having a light, where the method includes: providing a lens portion having an opening therethrough, where the lens portion has an inner face and an outer face; providing a back portion; mounting a first electrical connector on an inner face of the back portion; mounting at least one light source on the inner face of the back portion; electrically connecting the first electrical connector to the at least one light source; mounting a second electrical connector on the inner face of the back portion; electrically connecting the first electrical connector to the second electrical connector; exposing a connection interface of the second electrical connector on the outer face of the lens portion of the light enclosure; sealing the second electrical connector to the lens portion of the light enclosure where the seal is waterproof; and sealing a perimeter of the lens portion to a perimeter of the back portion, where the seal is waterproof.

In some embodiments, the method further includes fusing the connection (i.e., including a fuse in series with at least one of the wires, or using a fuse-wire that will present an open circuit if too much current is applied through it) between the first electrical connector and the second electrical connector. When electrical power is applied to the first electrical connector, electrical power is supplied to the second electrical connector.

In some embodiments, the method further includes covering the second electrical connector on the lens portion of the enclosure, where the covering provides a waterproof seal over the second electrical connector; and providing a light emitting diode, mounting the light emitting diode in the covering for the second electrical connector, and, when the covering is installed on the second electrical connector, connecting the light emitting diode to the second electrical connector, such that the light emitting diode illuminates when electrical power is applied to the first electrical connector, through the fuse and to the second electrical connector.

In some embodiments, the present invention further includes providing a vehicle, and mounting the enclosure in a body of the vehicle. The first electrical connector is a jack configured to receive an electrical plug connected to a wire/cable inside the vehicle, and the second electrical connector is a jack configured to receive a second electrical plug connected to a wire/cable outside the vehicle. In some embodiments, the second electrical plug has a female connection within a male connection.

In some embodiments, the method further includes providing a grommet and mounting the enclosure in a body of the vehicle, wherein the grommet provides a waterproof seal between the enclosure and the body of the vehicle.

In some embodiments, the enclosure is a running light for the vehicle.

In some embodiments, the present invention is an apparatus which includes: a lens portion having an opening therethrough, where the lens portion has an inner face and an outer face; a back portion; a means for mounting a first electrical connector to the back portion; a means for mounting at least one light source on an inner face of the back portion; a means for electrically connecting the first electrical connector to the at least one light source; a means for mounting a second electrical connector to the back portion; a means for electrically connecting the first electrical connector to the second electrical connector; a means for exposing a connection interface of the second electrical connector on the outer face of the lens portion of the light enclosure; a means for sealing the second electrical connector to the lens portion of the light enclosure, where the seal is waterproof; and a means for sealing a perimeter of the lens portion to a perimeter of the back portion, where the seal is waterproof.

In some embodiments, the apparatus further includes a means for electrically connecting a fuse in the connection between the first electrical connector and the second electrical connector, such that when electrical power is applied to the first electrical connector, electrical power is supplied to the second electrical connector.

In some embodiments, the present invention further includes a means for covering the second electrical connector on the lens portion of the enclosure, where the cover provides a waterproof seal over the second electrical connector; and a means for mounting a light emitting diode in the cover for the second electrical connector, and a means for connecting the light emitting diode to the second electrical connector when the cover is installed on the second electrical connector, such that the light emitting diode illuminates when electrical power is applied to the first electrical connector.

In some embodiments, the present invention includes a means for mounting the enclosure in a body of a vehicle, where the first electrical connector is a jack configured to receive an electrical plug connected to a wire/cable inside the vehicle, and the second electrical connector is a jack configured to receive a second electrical plug connected to a wire/cable outside the vehicle. In some embodiments, the second electrical plug has a female connection within a male connection.

In some embodiments, the apparatus further includes a means for mounting the enclosure in the body of the vehicle with a grommet, wherein the grommet provides a waterproof seal between the enclosure and the body of the vehicle.

It is specifically contemplated that the present invention includes embodiments having combinations and subcombinations of the various embodiments and features that are individually described herein, including the various embodiments described by patent applications and patents incorporated by reference herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
an enclosure for a light, the enclosure including:
a lens and a back portion, wherein the lens has an inner face, an outer face, and an edge;
a first electrical connector mounted to the back portion;
a primary light source inside the enclosure connected to the first electrical connector such that when electrical power is applied to the first electrical connector, the primary light source illuminates; and
a second electrical connector having a connection interface exposed on the outer face of the lens of the light enclosure at a connection-interface location on the outer face of the lens, wherein the connection-interface location is not on the edge of the lens, wherein the second electrical connector is electrically connected to the first electrical connector, and wherein the second electrical connector is sealed to the lens of the light enclosure.

2. The apparatus of claim 1, further including a fuse in series with the connection between the first electrical connector and the second electrical connector, wherein when electrical power is applied to the first electrical connector and the fuse is intact, electrical power is supplied through the fuse to the second electrical connector, and wherein when electrical power is applied to the first electrical connector and the fuse is blown, the primary light source remains illuminated by the electrical power applied to the first connector, but electrical power is not supplied to the second electrical connector.

3. The apparatus of claim 2, wherein the enclosure further includes a pluggable cover for the second electrical connector on the lens of the enclosure, wherein the cover is removable from the second electrical connector, but when plugged into position, provides a water-resistant seal over the second electrical connector and, wherein the cover further includes a light-emitting diode that connects to the second electrical connector when the cover is in the sealing position and illuminates when electrical power is applied through the second electrical connector.

4. The apparatus of claim 1, further comprising a vehicle, wherein the light enclosure is mounted in a body of the vehicle, and, wherein the first electrical connector is a jack configured to receive an electrical plug connected to a wire/cable inside the vehicle, and wherein the second electrical connector is a jack configured to receive a second electrical plug connected to a wire/cable outside the vehicle.

5. The apparatus of claim 4, wherein the second electrical plug has a female connection within a male connection.

6. The apparatus of claim 4, wherein a grommet is used to mount the light enclosure in a body of the vehicle, wherein the grommet provides a waterproof seal between the light enclosure and the body of the vehicle.

7. The apparatus of claim 4, wherein the enclosure is a tail light for the vehicle.

8. The apparatus of claim 1, further including a pluggable cover for the second electrical connector on the lens of the enclosure, wherein the cover is removable from the second electrical connector, but when plugged into position, provides a water-resistant seal over the second electrical connector, and wherein the cover further includes a light-emitting diode that connects to the second electrical connector when the cover is in the sealing position and illuminates when electrical power is applied through the second electrical connector.

9. A method for making an enclosure having a light, the method comprising:
providing a lens having an opening therethrough, wherein the lens has an inner face, an outer face, and an edge;
providing a back portion;
mounting a first electrical connector to the back portion;
mounting at least one light source on an inner face of the back portion;
electrically connecting the first electrical connector to the at least one light source;
mounting a second electrical connector to the back portion;
electrically connecting the first electrical connector to the second electrical connector;
exposing a connection interface of the second electrical connector on the outer face of the lens of the light enclosure at a connection-interface location on the outer face of the lens, wherein the connection-interface location is not on the edge of the lens;
sealing the second electrical connector to the lens of the light enclosure wherein the seal is waterproof; and
sealing a perimeter of the lens to a perimeter of the back portion, wherein the seal is waterproof.

10. The method of claim 9, further including fusing the connection between the first electrical connector and the second electrical connector to form a fused connection, wherein when electrical power is applied to the first electrical connector and the fused connection is intact, electrical power is supplied through the fused connection to the second electrical connector, and wherein when electrical power is applied to the first electrical connector and the fused connection is blown, the at least one light source remains illuminated by the electrical power applied to the first electrical connector, but electrical power is not supplied to the second electrical connector.

11. The method of claim 9, further including covering the second electrical connector on the lens of the enclosure, wherein the covering provides a water-resistant seal over the second electrical connector; and providing a light emitting diode, mounting the light emitting diode in the cover for the second electrical connector, and, when the cover is installed on the second electrical connector, connecting the light emitting diode to the second electrical connector, wherein the light emitting diode illuminates when electrical power is applied to the first electrical connector.

12. The method of claim 9, further providing a vehicle, and mounting the enclosure in a body of the vehicle and, wherein the first electrical connector is a jack configured to receive an electrical plug connected to a wire/cable inside the vehicle, and wherein the second electrical connector is a jack configured to receive a second electrical plug connected to a wire/cable outside the vehicle.

13. The method of claim 12, wherein the second electrical plug has a female connection within a male connection.

14. The method of claim 12, further providing a grommet and mounting the grommet in a body of the vehicle and the enclosure in the grommet, wherein the grommet provides a waterproof seal between the enclosure and the body of the vehicle.

15. The method of claim 12, wherein the enclosure is a running light for the vehicle.

16. An apparatus comprising:
a lens having an opening therethrough, wherein the lens has an inner face, an outer face, and an edge;
a back portion;
means for mounting a first electrical connector to the back portion;
means for mounting at least one light source on an inner face of the back portion;
means for electrically connecting the first electrical connector to the at least one light source;
means for mounting a second electrical connector to the back portion;
means for electrically connecting the first electrical connector to the second electrical connector;
means for exposing a connection interface of the second electrical connector on the outer face of the lens of the light enclosure at a connection-interface location on the outer face of the lens, wherein the connection-interface location is not on the edge of the lens;
means for sealing the second electrical connector to the lens of the light enclosure, wherein the seal is waterproof; and
means for sealing a perimeter of the lens to a perimeter of the back portion, wherein the seal is waterproof.

17. The apparatus of claim 16, further comprising means for electrically fusing the connection between the first electrical connector and the second electrical connector, wherein when electrical power is applied to the first electrical connector, electrical power is supplied through the means for electrically fusing to the second electrical connector if the means for electrically fusing is not open, and wherein when electrical power is applied to the first electrical connector and the means for electrically fusing is open, the at least one light source remains illuminated by the electrical power applied to the first electrical connector, but electrical power is not supplied to the second electrical connector.

18. The apparatus of claim 16, further comprising:
means for covering the second electrical connector on the lens of the enclosure, and
means for emitting light from the means for covering.

19. The apparatus of claim 16, further comprising means for mounting the enclosure in a body of a vehicle, wherein the first electrical connector is a jack configured to receive an electrical plug connected to a wire/cable inside the vehicle, and wherein the second electrical connector is a jack configured to receive a second electrical plug connected to a wire/cable outside the vehicle.

20. The apparatus of claim 19, wherein the second electrical plug has a female connection within a male connection.

21. The apparatus of claim 19, further comprising means for mounting the enclosure in the body of the vehicle with a grommet, wherein the grommet provides a waterproof seal between the enclosure and the body of the vehicle.

* * * * *